United States Patent [19]

Totaro

[11] Patent Number: 5,016,571

[45] Date of Patent: May 21, 1991

[54] BIRD OBSERVATORY

[76] Inventor: Charles C. Totaro, 506 Hemlock Hill Dr., Toms River, N.J. 08753

[21] Appl. No.: 561,915

[22] Filed: Aug. 2, 1990

[51] Int. Cl.⁵ .............................................. A01K 31/14
[52] U.S. Cl. ........................................ 119/23; 119/57.8
[58] Field of Search ....................... 119/23, 18, 17, 15, 119/19, 57.8, 51.01

[56] References Cited

U.S. PATENT DOCUMENTS

| | | | |
|---|---|---|---|
| D. 245,927 | 9/1977 | Edwards et al. | 030/110 |
| 1,887,869 | 11/1932 | Clampitt | 119/26 |
| 2,430,541 | 11/1947 | Thatcher | 119/57.8 |
| 3,041,911 | 7/1962 | Marder | 84/94 |
| 3,792,685 | 2/1974 | Wiener | 119/23 |
| 3,847,120 | 11/1974 | Hicks | 119/29 |
| 4,384,547 | 5/1983 | Mattox | 119/18 |
| 4,878,643 | 11/1989 | Stinson | 248/475.1 |
| 4,881,491 | 11/1989 | Brown | 119/51.01 |
| 4,928,631 | 5/1990 | Smith | 119/23 |

FOREIGN PATENT DOCUMENTS 3620449  12/1987  Fed. Rep. of Germany ........ 119/23

Primary Examiner—John G. Weiss
Attorney, Agent, or Firm—Ralph W. Selitto, Jr.

[57] ABSTRACT

A birdhouse includes a one-way viewing wall or window which allows the birds to be viewed inside the birdhouse without allowing them to see their observer. The birdhouse can be mounted on a window sill such that the one-way viewing wall is adjacent to a window pane, thereby allowing any number of observers to simultaneously view the birds in their natural environment without intruding on their privacy. Thus, the birdhouse functions as an observatory.

18 Claims, 1 Drawing Sheet

BIRD OBSERVATORY

FIELD OF THE INVENTION

The present invention relates, in general, to a birdhouse, and, more particularly, to a birdhouse having a one-way viewing wall which permits an observer to view birds inside the birdhouse without allowing the birds to see their observer.

BACKGROUND OF THE INVENTION

Devices for housing birds have been proposed in the past. Most such devices, however, do not allow viewing of the birds once they are inside of the house. This type of viewing would be highly desirable, and would add to the enjoyment of the birdhouse owner.

U.S. Pat. No. Des. 245,927 discloses a design for a glass birdhouse. While a glass birdhouse would allow the birds inside to be observed, the birds would also be able to see their observer, thereby creating the possibility that the birds will be startled or otherwise distracted.

German Patent No. 3,620,449 discloses a bird or animal hide or house which is provided with a transparent wall having a periscope-type mirror arrangement connected thereto. The transparent wall cooperates with the mirror arrangement to permit birds or animals to be observed without harmful intrusion. Such a device, however, is limited to viewing by one observer at a time as a result of its use of the periscope-type mirror arrangement. In addition to increasing construction costs due to its complexity, the periscope-type mirror arrangement also necessitates that the observer be in fairly close proximity to the birdhouse, thereby creating the possibility that the birds will be startled or otherwise distracted.

SUMMARY OF THE INVENTION

The problems and disadvantages of the prior art devices discussed above are overcome in accordance with the present invention by providing a birdhouse with a one-way viewing wall capable of converting the birdhouse into a bird observatory. More particularly, by positioning such a bird observatory adjacent to a window pane, the one-way viewing wall would allow a number of observers to view the birds simultaneously without the need to be in close proximity to them, thereby reducing the possibility that the birds will be startled or otherwise distracted by their observers.

In one embodiment, the one-way viewing wall is a one-way window. Depending upon the "one-way vision" performance characteristics of such a window, the roof and other walls of the bird observatory can be opaque or translucent.

BRIEF DESCRIPTION OF THE DRAWING

For a more complete understanding of the present invention, reference is made to the following detailed description of an exemplary embodiment considered in conjunction with the accompanying drawing, in which.

DETAILED DESCRIPTION OF THE EXEMPLARY EMBODIMENT

Figure 1:
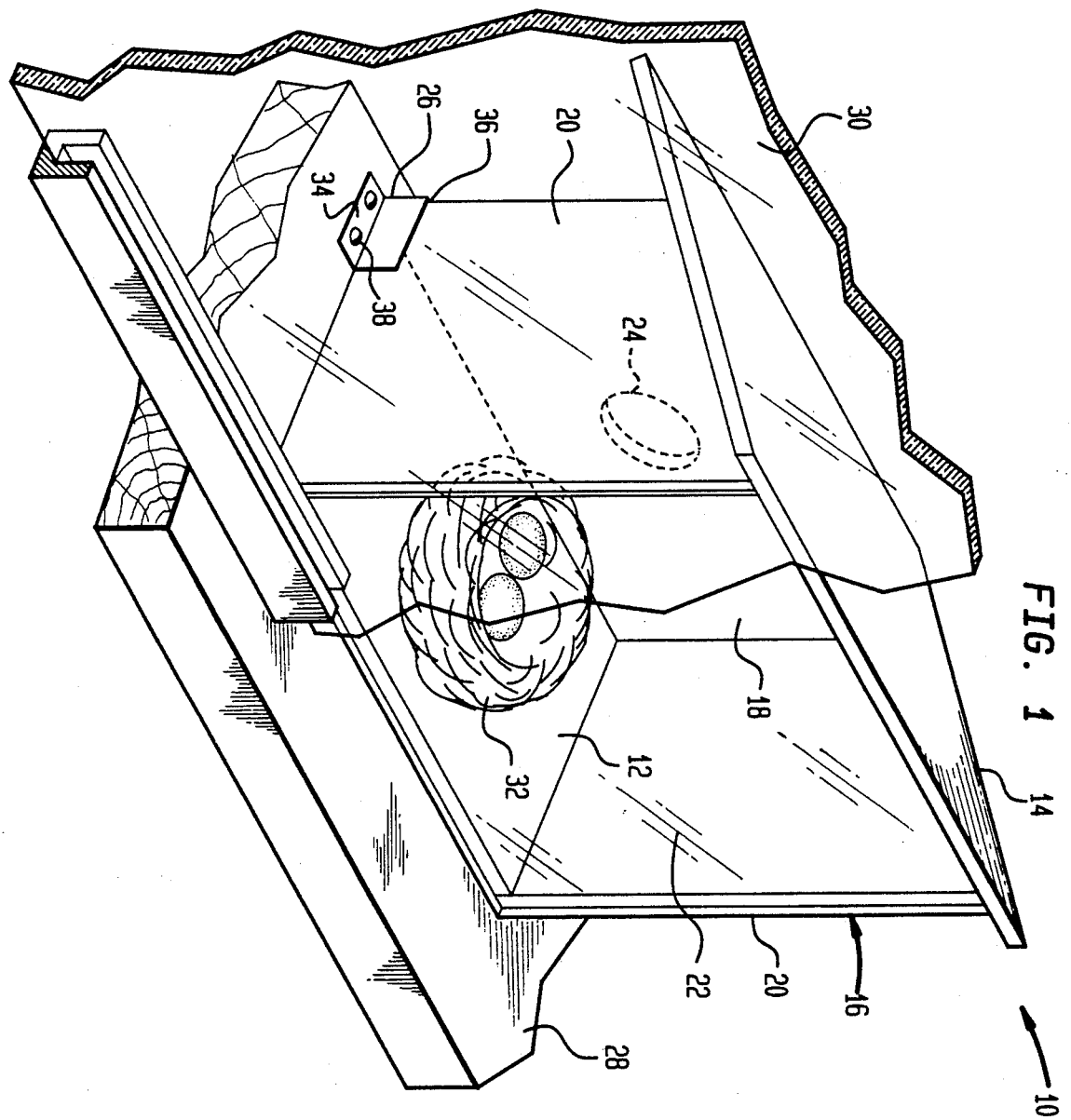
FIG. 1 is a perspective view of a bird observatory constructed in accordance with one exemplary embodiment of the present invention, the bird observatory being shown positioned adjacent to a window sill.

Referring to FIG. 1, a bird observatory 10 includes a base 12, a roof 14, and a housing 16. The housing 16 and the roof 14 form a cover for the base 12, and they cooperate with the base 12 to form a weatherproof enclosure.

The housing 16 includes a front wall 18, a pair of side walls 20, and a one-way viewing wall 22. The front wall 18 has at least one opening 24 therein, which allows the birds to enter and exit. A bird's nest 32 is shown sitting on the base 12 of the bird observatory 10.

The one-way viewing wall 22 could be a conventional one-way window. Typically, such one-way windows consist of glass which has been coated with a layer of silver thinner than that used for a mirror. This partial-silvering reflects most of the light that falls on it (from either side), but permits some light to pass through. Typically, the observer side of the window is exposed to more light than the opposite (i.e., subject) side of the window. Most of the light from the brighter subject side of the window is reflected to form a bright image which masks the relatively small amount of light passing through the window from the darker observer side. However, enough light does pass through the window from the subject side to give the observer a clear view of the subject. Thus, by employing such a one-way window as the viewing wall 22, observers located externally of the bird observatory 10 could view birds nesting inside the bird observatory 10 by looking through the one-way window of the viewing wall 22. Because the birds being viewed within the bird observatory 10 could not see out through the viewing wall 22, they would be unaware of their observers. SOLARBAN ®Gray or Bronze, or SOLARCOOL ® Gray or Bronze made by PPG Industries, Inc. are examples of commercially available products which could form one-way windows suitable as the one-way viewing wall 22.

For the reasons indicated above, the use of a one-way window as the viewing wall 22 would normally require the subject side of the one-way window to be brighter than the observer side. If the one-way window has a glass transmittance value selected such that the subject (i.e., the birds within the bird observatory 10) does not have to be brightly illuminated, then the roof 14 and the walls 18, 20 can be made out of an opaque material. If, on the other hand, the subject must be brightly illuminated in order to achieve the desired "one-way vision" performance of the viewing wall 22, then the roof 14 and/or the walls 18, 20 could be made out of a translucent material which would allow light to enter the bird observatory 10 without allowing the birds to see out.

A pair of L-shaped mounting brackets 26 (only one of which is visible in FIG. 1) can be used to securely mount the bird observatory 10 to a window sill 28 such that the one-way viewing wall 22 is positioned adjacent to a window pane 30. Each of the brackets 26 includes a horizontal flange 34 and a vertical flange 36. Each of the horizontal flanges 34 is provided with holes (not shown) adapted to receive screws 38. Each of the vertical flanges 36 wraps around and supports the front wall 18 of the bird observatory 10. For window installations without sills, the bird observatory 10 can be supported by any other suitable mechanism, such as a hanger or a post.

In use, the bird observatory 10 is positioned on the window sill 28 such that the one-way viewing wall 2 is adjacent to the window pane 30. An observer or observers, who can be positioned anywhere within an adjoining room, would then be able to view the nesting birds without the need to be in close proximity to them. Furthermore, the observer can move freely about the room without fear of startling the birds. In the event that a conventional one-way window is employed as the viewing wall 22, its "one-way vision" performance can be enhanced by turning out the lights of the room in which the observer or observers are located to thereby darken the observer side of the one-way window.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

I claim:

1. In a birdhouse, including an exterior housing which defines an interior compartment for housing birds, said exterior housing including side walls, which surround said interior compartment, and a roof, the improvement wherein said exterior housing includes one-way viewing means for allowing an observer to view birds in said interior compartment without allowing birds in said interior compartment to see their observer, whereby said birdhouse functions as both a habitat for birds and a bird observatory, and wherein said roof is made out of a light-transmitting material, whereby light entering said interior compartment through said roof illuminates said interior compartment to an extent sufficient to enhance an observer's view through said one-way viewing means.

2. The improved birdhouse of claim 1, wherein said one-way viewing means is provided in one side wall of said exterior housing.

3. The improved birdhouse of claim 2, wherein said one-way viewing means is a one-way window.

4. The improved birdhouse of claim 2, wherein said roof is translucent, the translucency of said roof being selected so as to allow light to enter said interior compartment of said birdhouse without allowing the birds to see out of said birdhouse through said roof.

5. The improved birdhouse of claim 4, wherein at least another of said side walls of said exterior housing is translucent, the translucency of said at least another of said side walls being selected so as to allow light to enter said interior compartment of said birdhouse without allowing the birds to see out of said birdhouse through said at least another of said side walls.

6. The improved birdhouse of claim 2, wherein at least another of said side walls of said exterior housing is translucent, the translucency of said at least another of said side walls being selected so as to allow light to enter said interior compartment of said birdhouse without allowing the birds to see out of said birdhouse through said at least another of said side walls.

7. The improved birdhouse of claim 1, wherein said interior compartment includes a nest.

8. In combination, a window having a window pane; a bird observatory, said bird observatory including an exterior housing which defines an interior compartment for housing birds, said exterior housing including side walls, which surround said interior compartment, a roof and one-way viewing means for allowing an observer to view birds in said interior compartment without allowing birds in said interior compartment to see their observer, whereby said bird observatory also functions as a habitat for birds, said roof being made out of a light-transmitting material, whereby light entering said interior compartment through said roof illuminates said interior compartment to an extent sufficient to enhance an observer's view through said one-way viewing means; and mounting means for mounting said bird observatory outside of said window such that said one-way viewing means is adjacent to an exterior surface of said window pane.

9. A combination according to claim 8, wherein said one-way viewing means is provided in one side wall of said exterior housing, said one side wall being positioned adjacent to said exterior surface of said window pane.

10. A combination according to claim 9, wherein said one-way viewing means is a one-way window.

11. A combination according to claim 9, wherein said roof is translucent, the translucency of said roof being selected so as to allow light to enter said interior compartment of said birdhouse without allowing the birds to see out of said birdhouse through said roof.

12. A combination according to claim 11, wherein at least another of said side walls of said exterior housing is translucent, the translucency of said at least another of said side walls being selected so as to allow light to enter said interior compartment of said birdhouse without allowing the birds to see out of said birdhouse through said at least another of said side walls.

13. A combination according to claim 9, wherein at least another of said side walls of said exterior housing is translucent, the translucency of said at least another of said side walls being selected so as to allow light to enter said interior compartment of said birdhouse without allowing the birds to see out of said birdhouse through said at least another of said side walls.

14. A combination according to claim 8, wherein said interior compartment includes a nest.

15. A method of observing birds in their natural environment, comprising the steps of:
providing a bird observatory which includes an exterior housing defining an interior compartment, said exterior housing including side walls, which surround said interior compartment, a roof and one-way viewing means for allowing an observer to view birds in said interior compartment without allowing birds in said interior compartment to see their observer, whereby said bird observatory also functions as a habitat for birds, said roof being made out of a light-transmitting material, whereby light entering said interior compartment through said roof illuminates said interior compartment to an extend sufficient to enhance an observer's view through said one-way viewing means; and
mounting said bird observatory outside of a window of a room such that said one-way viewing means is adjacent to an exterior surface of a pane of said window.

16. The method of claim 15, comprising the further step of darkening said room whereby the performance of said one-way viewing means is enhanced.

17. The method of claim 15, wherein said roof is translucent, the translucency of said roof being selected so as to allow light to enter said interior compartment of said bird observatory without allowing the birds to see out of said bird observatory through said roof.

18. The method of claim 15, wherein said interior compartment includes a nest.

* * * * *